(12) United States Patent
Traulsen et al.

(10) Patent No.: US 8,313,052 B2
(45) Date of Patent: Nov. 20, 2012

(54) POWDER MIXTURE FOR MANUFACTURE OF A BATTERY ELECTRODE, A RESPECTIVE BATTERY ELECTRODE AND A METHOD FOR MANUFACTURING SAME

(75) Inventors: Tim Traulsen, Pirna (DE); Thomas Hucke, Dresden (DE); Thomas Rodig, Moritzburg (DE)

(73) Assignee: Biotronik CRM Patent AG, Baar (CH)

( * ) Notice: Subject to any disclaimer, the term of this patent is extended or adjusted under 35 U.S.C. 154(b) by 177 days.

(21) Appl. No.: 12/875,238

(22) Filed: Sep. 3, 2010

(65) Prior Publication Data

US 2010/0330432 A1   Dec. 30, 2010

Related U.S. Application Data

(60) Continuation-in-part of application No. 12/814,868, filed on Jun. 14, 2010, now Pat. No. 8,210,838, which is a division of application No. 11/608,111, filed on Dec. 7, 2006, now Pat. No. 7,758,782.

(30) Foreign Application Priority Data

Dec. 9, 2005   (DE) .......................... 10 2005 059 375

(51) Int. Cl.
*B02C 19/00*   (2006.01)
(52) U.S. Cl. .......................................... 241/21; 241/22

(58) Field of Classification Search ............ 241/21, 241/29, 16, 22
See application file for complete search history.

(56) References Cited

U.S. PATENT DOCUMENTS

| 4,236,927 A | 12/1980 | Buehl et al. |
| 5,387,478 A | 2/1995 | Muta et al. |

FOREIGN PATENT DOCUMENTS

| DE | 11 83 149 A | 7/1960 |
| DE | 12 25 722 A | 9/1961 |
| DE | 77 07 702 U1 | 3/1977 |
| EP | 0307209 A1 | 3/1989 |
| GB | 1073294 A | 6/1967 |
| JP | 58111261 A | 7/1983 |
| WO | WO 02052664 | 7/2002 |

OTHER PUBLICATIONS

European Search Report, dated May 7, 2007.
German Search Report, dated Mar. 27, 2006.

*Primary Examiner* — Mark Rosenbaum
(74) *Attorney, Agent, or Firm* — ARC IP Law, PC; Joseph J. Mayo

(57) ABSTRACT

A method for manufacturing of a powder mixture for a battery electrode that includes suspending of particles of at least one binder within an inert solvent producing a first suspension, slowly suspending of particles of an active material within the first suspension producing a second suspension, drying of the second suspension producing a granulate material. Further relates to a respective powder mixture, an electrode and a method of manufacturing the electrode.

8 Claims, 8 Drawing Sheets

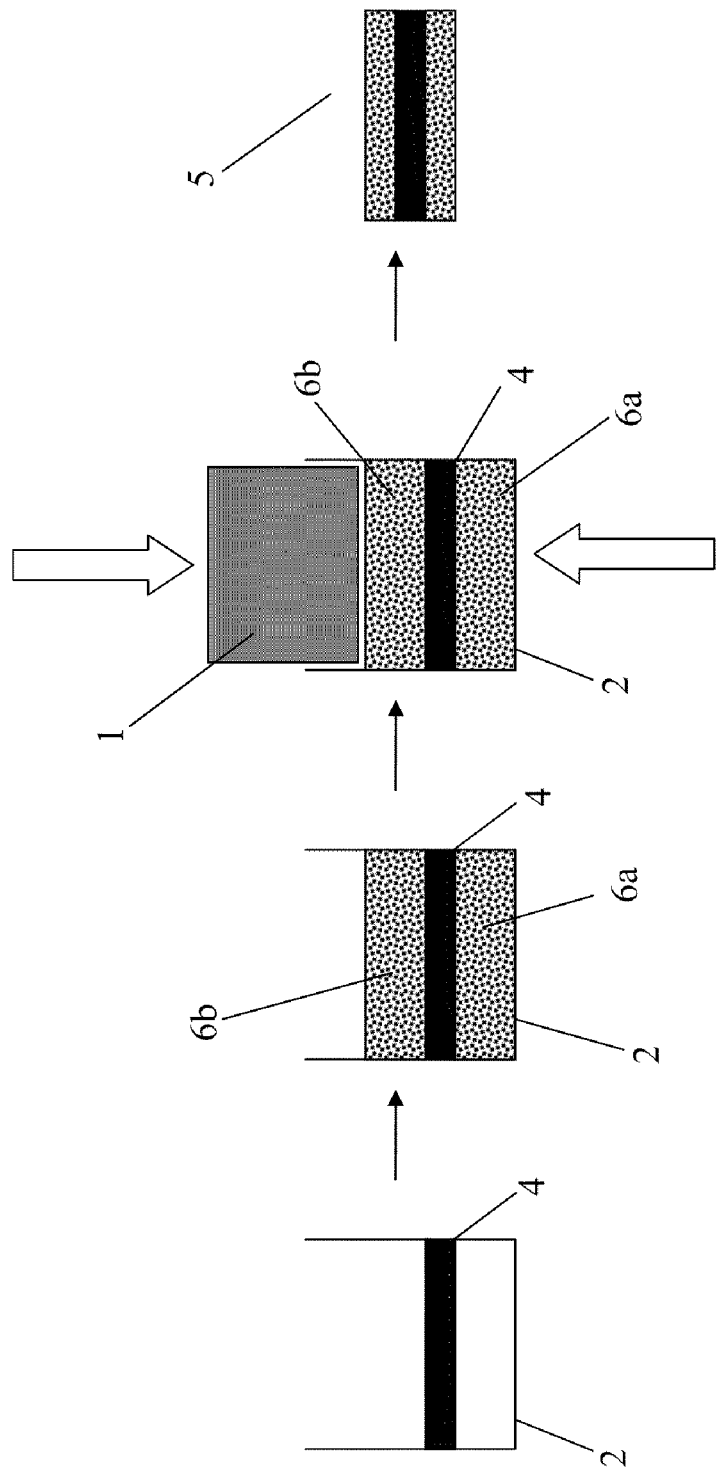

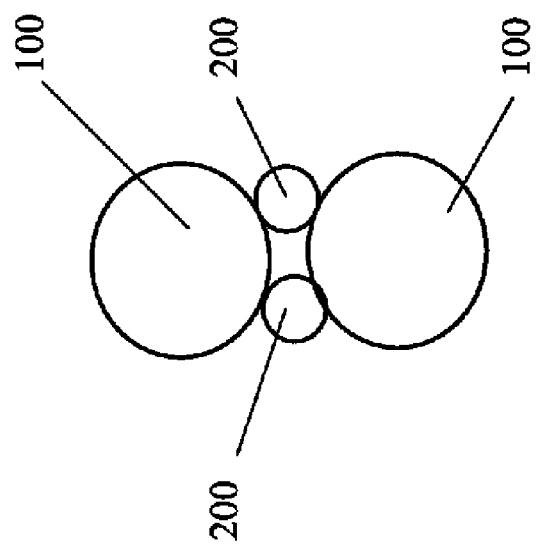

POWDER MIXTURE FOR MANUFACTURE OF A BATTERY ELECTRODE, A RESPECTIVE BATTERY ELECTRODE AND A METHOD FOR MANUFACTURING SAME

This application is a continuation-in-part of U.S. Utility patent application Ser. No. 12/814,868 filed 14 Jun. 2010 now U.S. Pat. No. 8,210,838, which is a divisional of U.S. patent application Ser. No. 11/608,111 filed 7 Dec. 2006, now U.S. Pat. No. 7,758,782, which takes priority from German Patent Application DE 10 2005 059 375.5 filed 9 Dec. 2005, the specifications of which are all hereby incorporated herein by reference.

BACKGROUND OF THE INVENTION

1. Field of the Invention

Embodiments of the invention relate to a powder mixture for manufacture of a battery electrode, a respective battery electrode, and a method of manufacturing of an active material powder mixture for the production of battery electrodes, particularly for lithium batteries. Embodiments of the invention further relate to the method for manufacturing of a respective battery electrode.

2. Description of the Related Art

Batteries are sources for electrical energy which are commonly used. Important elements of a battery are the negative electrode, typically called the anode, and the positive electrode, typically called the cathode. Usually, the anode comprises active material that can be oxidized and the cathode comprises active material that can be reduced.

One well-known method for manufacturing of an electrode (anode or cathode) uses powder mixtures. For example, battery electrodes are produced by wet coating methods. In these methods, the powder is dispersed together with a binder in a solvent. The solvent is selected for this purpose so that it wets the components of the powder sufficiently and simultaneously it has a sufficiently high solubility for the binder. Aqueous dispersions or dispersions based on organic solvents (e.g., alcohols, ketones, amines, amides, ethers) are used for this purpose. These dispersions are applied to an electrically conductive carrier (e.g., metals, conductively coated polymers) and the solvent is removed by drying.

The disadvantages of this method are manifold. The production of the dispersions is time-consuming and costly and the useful lives of the dispersions are frequently limited by coagulation or sedimentation. Furthermore, secondary reactions occur due to the decomposition of the solvent(s), possibly also due to secondary reactions with the dispersed substances or with the dissolved binders. These lower the useful lives of the coating solutions. Disadvantages arise both with aqueous coating solutions and also with organic solvents. Aqueous coating solutions are nontoxic, but may only be dried with difficulty. Long drying times or high drying temperatures are necessary. Moisture-sensitive materials may not be coated by aqueous solvents. Organic solvents typically require a high technical outlay (explosion protection, fire protection, solvent reclamation/solvent combustion). The requirements for labor protection (toxicity, annoyance due to bad smells) are typically high. Quantitative reclamation is typically not possible. The production of homogeneous coatings is technically demanding and costly because of the rheological properties of the dispersions and the drying of such coatings produces high energy costs and is time-consuming.

Above all in lithium batteries, the selection of the binders stable under the operating conditions of the battery is limited. Often, only fluorinated polymers are usable. These are frequently only soluble in special, expensive organic solvents having high boiling points. The solvents increase the porosity of the coating during the drying process. To increase the energy density of the coating, additional work steps are therefore necessary after the drying to compact the electrodes (pressing, calendering).

Further methods known from the prior art are pressing methods. In these methods, powder mixtures are compressed to form tablets, rings, or cups (pressed parts). The powder mixtures may also be processed to form strands or films by extrusion. The electrical discharge of the current occurs in this case by laminating on a metallic current collector, possibly with the aid of an electrically conductive adhesive. The contact may also be produced by a simple press contact. The discharge is frequently ensured by a press contact with the housing of the battery or by a nail which is driven into the pressed part.

These methods also have disadvantages. The contact areas of the pressed parts for the press contacting are typically small, the carrying capacity of the batteries is limited. Furthermore, disadvantages have been established if a homogeneous material bond is not produced between the current collector and the housing (e.g., by welding). The transition resistance of the press contact may then rise in the course of the battery life due to the formation of cover layers, due to gas development, or due to corrosion. A rise of the transition resistance of press contact has also been established when the pressure which acts on the press contact is reduced in the course of the battery life. The causes of this could, for example, be an expansion of the housing due to swelling of the battery materials or due to gas development.

In hermetically sealed batteries, in which no polymer seals could be used for sealing and insulating housing parts, only one electrode could be electrically connected by a press contact. The other electrode must be electrically connected to the battery housing using a bushing insulated from the battery housing (e.g., a glass-metal bushing). A connection of the electrode to a current collector is required for this purpose.

A further grave disadvantage is the low mechanical stability of the pressed parts. Because of this disadvantage, there must be a sufficiently high wall thickness according to the prior art. This results in a low electrical carrying capacity of the battery. For mechanical stabilization, the pressing method may be performed directly in the battery housing (e.g., with alkali manganese batteries). This requires sufficient material thicknesses of the housing and is bound to suitable housing geometries (cylindrical housing). It has also been shown that laminating on a current collector represents an additional time-consuming and costly work step.

In many cases powdered materials and/or mixtures of powdered materials are used to produce battery electrodes. These are coated on an electrically conductive material, which is used as the current collector. The powdered materials are therefore preferred because they form porous structures having a large surface in relation to the ion-conducting electrolytes. A high carrying capacity of the battery electrode per unit area is thus achieved.

In particular for thin electrodes e.g. for high-power applications in implantable Cardioverter Defibrillators with typically electrode thicknesses below 0.8 mm fine powders of an active material, binder or, if applicable, additive have to be used. Additionally, the powders of the components of the electrode must be dosed exactly, in order to reach an exact composition of the electrode material.

Fine powders or mixtures of fine powders show a limited flowability, in particular if materials with low density are used (for example carbon black or graphite, which are often used as additives). This limited flowability leads to difficulties in powder dosing, in particular in an automated production process. This property is particularly a disadvantage if the powders or powder mixtures are used to produce low bulk heights with uniform layer thickness.

Powder is a disperse system which consists of a plurality of single particles. A bulk powder mixture is a homogeneous mixture of powders (primary particle system) without stable interparticular connection.

Different methods for manufacturing of electrode powder mixture are known. Document DE 10 2007 034 178 A discloses a method for manufacturing of electrodes using suspensions comprising active nano material. The documents U.S. Pat. No. 7,527,895 B2 and U.S. Pat. No. 6,946,220 describe the production of high power electrodes for lithium batteries by wet coating.

Therein, the additives (for example black carbon or graphite) are pre-mixed with the active material (for example $LiNiCoAlO_2$, $MnO_2$, $FeS_2$, $Ag_xV_2O_y$) and are then suspended in a binder solution. Within the binder solution a polymer solvent (for example PvdF, PTFE) adsorbs to the surface of the active material particle forming a binder coating. The coating promotes the adhesion of the additive particles.

Such suspensions are then applied onto current collectors (for example a grid or a foil) using a wet coating apparatus. The coated current collectors are then dried to the necessary residual moisture for lithium batteries on a drying band-conveyer. The electrode packet (anode or cathode) is then produced using a winding or stacking technology.

From document U.S. Pat. No. 5,571,637 it is known that a wet active material (paste) is compressed in order to get electrode pellets. The pellets are subsequently dried. Additionally, dry-pressing of active material powder is described in order to produce electrodes.

During wet coating of solvent containing suspensions according to the state of the art methods a drip time of the coating solutions has to be considered. Another disadvantage of these state of the art methods is that solutions sediment or exhibit a limited handling duration. The handling duration is getting the shorter, the more reactive the used active material with the binder, the solvent or the additive is.

BRIEF SUMMARY OF THE INVENTION

A feature of one or more embodiments of the invention is, to specify a novel method for powder manufacturing and battery electrodes manufacturing from powder mixtures, which overcome the disadvantages known from the prior art. Further, a respective powder mixture and a respective electrode are developed.

This feature is obtained as claimed herein.

In particular, the feature is achieved by a powder mixture comprising predominantly agglomerates containing both, particles of an active material and particles of at least one binder. It is also possible to use mixtures of different active materials.

By agglomeration of powder particles, which are, in particular, spherical, the flowability of the powder is enhanced. The inventive granulate material allows the automatic production of homogeneous powder bulk material with low bulk height. This powder bulk can be compacted in an automatic pressure process in order to produce very thin, mechanically stable battery electrodes.

Within this invention a granulate material or agglomerate is a particle organization having mechanically stable agminated or linked fine disperse primary particles.

In a preferred embodiment, the agglomerates further comprise particles of at least one additive.

The additives improve the properties of the electrode.

It is further advantageous, if the particles of the at least one binder are fine dispersively distributed between the particles of the active material and, if applicable, the particles of the at least one additive within the agglomerates.

By granulation of active material particles with binder particles and, optional, with additive particles, the flowability of the powder mixture is substantially enhanced. This is in particular true, if carbon black or graphite is used as an additive for the improvement of the electrical conductivity of the battery electrode.

The above feature is further obtained by a method for manufacturing of the powder mixture comprising the following steps:

Suspending of particles of at least one binder within an inert solvent producing a first suspension;

Preferably slowly suspending of particles of an active material within said first suspension producing a second suspension;

Drying of said second suspension producing a granulate.

The inventive method can be used for the production of anodes and cathodes of batteries, in particular lithium batteries. In principle, all powder battery materials are suited for the inventive procedure.

In an embodiment of the invention, after drying of the second suspension the granulate material is sieved by a sieve with a predefined mesh width in order to get a granulate material with a predefined size of the granules.

In a preferred embodiment sieve cascades with meshes of 800 μm to 300 μm are used.

It is further preferred, if between the production of the first suspension and the production of the second suspension particles of at least one additive are suspended within the first suspension. This is the most cost-effective way to add the additives enhancing the properties of the electrode material.

For the manufacturing of cathodes active material can be used, such as:

Metal oxides, for example manganese dioxide, lithium cobalt oxide, lithium manganese spinel, lithium nickel cobalt oxide, silver vanadium oxide;

Metal phosphates, for example copper oxyphosphates, iron phosphates, vanadium oxyphosphates;

Metal vanadates, for example copper vanadate;

Metal chromates, for example lead chromate.

For the production of anodes, active material can be used, such as:

Carbons, for example graphite, meso-carbon compositions;

Metal-oxides, for example lithium-titanium-oxide;

As a binder the material can be used, such as:

Polyvinylidendifluorid, Polyethylene, Polypropylene.

As an additive the materials can be used, such as:

Carbon black, graphite, expanded graphite, carbon fibers, metals and porosity promoters, like ammonium-carbonate.

For the production of the granulate material a low boiling solvent (Ts<150° C.) is used. It is important that the solvent is chemically inert with regard to the active material, the binder or the additive. Additionally, the binder is not or only very weak soluble within the solvent. As a solvent, for example, alkanes or cycloalkanes can be used.

From the particulate at least one binder a first suspension is produced using the solvent. Then, a second suspension is produced from the first suspension and the particles of the active material. In particular, a high shear mixing aggregate, for example a toothed ring disperser, can be used. During the production of the first and the second suspensions, the binder is not solved but its particles are finely dispersed. The suspended binder particles are finely dispersive distributed between the components of the active material. The binder is not adsorbed at the whole surface of the active material because of the low solubility of the binder within the solvent. In particular, no coating is formed on the surface of the active material by the binder.

The solvent is removed after complete homogenization of the suspension by distillation. Then, a granulate material occurs as a result of the inventive procedure which is free flowing and can be used for the manufacturing of thin electrodes.

By using a chemically inert solvent, for example alkanes or cycloalkanes, no chemical reaction of the solvent with the binder or the active material is observed. Therefore, using the inventive method, very reactive metal oxides can be processed. They do not show undesirable secondary reactions with the solvent or the dissolved binder during the wet chemical coating procedure as in other state of the art techniques.

Another advantage of the inventive method is that no traces of solvent appear within the electrode. Such solvent traces would impair the properties of the battery, because the solvent of the granulation would react with the components of the battery material.

Additionally, there is no limit of the handling duration or storage time for suspensions of the granulate material and the granulate material. In contrast to that, the suspensions for wet coating method show very limited handling duration or storage time.

Often there is an increase in temperature observed during the production of the suspensions caused by shearing. Regarding the inventive method, this does not lead to the intensification of secondary reactions between the solvent and the binder or the active material or the additive because the solvent is inert. Additionally, by using a high shear disperser the chain length of the polymers used within the inventive method is not shortened. The polymers are not physically diluted within the solvent but fine dispersively distributed within the suspension.

Other granulating or wet drying methods for the production of electrodes require solvents which are able to dilute the binder in order to form a coating. In contrast to that, during the inventive procedure, the solvent is only a tool for processing which distributes the binder particles fine dispersively between the other particulate components of the electrode material. Therefore, it is possible to use a bigger variety of binder-solvent-combinations with the inventive method. For the described process olefines or cyclic olefines are preferably being used e.g. hexane, cyclohexane, heptane, octane. Other solvents without significant solubility for the used binder and—depending on the active materials—without reactivity with the active electrode material can alternatively be used, e.g. ethers, alcohols.

For example, fluoric polymers, (i.e. Polyvinylidendifluorid) can be solved only in a very small number of solvents. These solvents, for example N-Methylpyrrolidon, show many unwanted secondary reactions with the active material. This is not observed using the inventive method.

The adhesion of the binder particles to the active material is observed mainly during the application of pressure. Prior the compaction step during the manufacturing of the electrode (see below) the produced granulate material shows only a weak affinity to agglomeration, so that a very precise dosing of the powder is possible.

It is well-known that coating forming polymers may impair the electrical loading capacity of the electrode active material, because the particle surfaces are changed by the binder coating. By the polymer coating, the ion conductivity between electrolyte and particle surface and the wettability of the particle surfaces by the electrolyte can be impeded. Pore size of the active material may be diminished by the polymer film or the pores may be inaccessible for the electrolyte. As the inventive method does not produce a binder film at the surface of the active material no surface effects diminishing the battery power are observed.

The person skilled in the art further knows that by using solvents reacting with the binder in an oxidation or reduction secondary compounds may be formed which are soluble within the electrolyte of the battery. Additionally, reactions between the electrolyte and those secondary reaction products are possible. If from these reaction products metal ions dissolve within the electrolyte, these metal ions could be deposited at the anode of the battery. Therefore such battery coating at the electrodes leads to voltage-delay of the batteries. The deposited substances cause an increase of impedance and therefore a decrease of discharging capability of the battery. With regard to re-chargeable batteries, the number of charging and re-charging cycles of the battery may be diminished by this process. In contrast to that the solvent of the inventive procedure does not react with the active material. Therefore, such severe consequences of secondary reactions are obviated using the inventive method.

As explained above, the manufacturing of the battery electrodes is done without solvent. The solvent is used for granulation, is recovered and can be reduced within a circulate process.

Therefore, the production process of the electrodes can be done without difficulty. It is not necessary to dispose the solvent.

The above feature is further achieved by a battery electrode containing a compacted powder mixture and a current collector, wherein the powder mixture and its manufacturing are described above.

In an embodiment of the inventive electrode the electrically current collector is covered on both sides by said compacted powder mixture. This is a cost effective method for continuous production of electrodes (as well as handling and storage). Dry compaction of granulated materials is advantageous because of the outstanding mechanical stability and handling properties of the electrodes. Additional to that there is a high precision in thickness and weight with small standard deviations and there is no need to measure each electrode before battery mounting.

Further, it is preferred that the current collector is a metallic grid.

More specific the metallic grid is etched and/or embossed and/or stamped or a grid made of stretched metal. However, any other suitable shape and/or any other suitable material may also be provided for the current collector.

The above feature is further solved by a method for manufacturing of a battery electrode comprising the following steps:

Pouring a first quantity of a powder mixture into a cavity, wherein said powder mixture comprises at least two components;

Laying a current collector onto said powder mixture;

Pouring a second quantity of said powder mixture into said cavity;

Compressing said first powder mixture quantity and said second power mixture quantity onto said current collector to form said battery electrode.

Preferably, the powder mixture is a powder mixture of an agglomerate material according to the above explanations.

In a further method variation, a current collector in the form of a metallic grid is first positioned in a filling cavity, for example horizontally, and the powder mixture is then provided. The powder mixture then flows through the grid of the current collector and forms a predefined quantity of the powder mixture above and below the grid, for example substantially 50% above and 50% below the grid or any other ratio so long as each side of the grid may be coated. Finally, the compression under pressure is performed.

The advantages of this method are, inter alia, that no solvent is necessary in the production of the electrodes. The drying of the electrodes is thus dispensed with, since the powdered starting materials used already have the moisture required for the later application.

Furthermore, it is now possible to produce very thin electrodes with a low binder content.

One advantage of one or more embodiments of the invention is the connection of a current collector to the pressed part. A method is described for integrating a current collector directly into a powder mixture, without lamination.

A further advantage is that no additional work steps are required for compressing the electrode and the electrode is connected to the current collector in one work cycle. This method according to one or more embodiments of the invention also allows the stabilization of the geometry by the current collector.

Further a device is explained which allows parts of a current collector not to be coated during the compression procedure. The device comprises a filling cavity, into which the powder mixture is poured to produce a positive and/or negative battery electrode. The powder mixture is pressed together with a current collector and shaped into a battery electrode by compression means, which preferably comprise an upper plunger and especially preferably an upper plunger and a lower plunger.

The current collector comprises parts to be coated and parts not to be coated. The parts to be coated are to be coated by the powder pressing. In order to protect parts of a current collector not to be coated from coating and damage occurring due to the pressing, the current collector is positioned in a support and a counter support. The support and the counter support preferably comprise pins, the support being formed by a spring-mounted pin. The section of the current collector not to be coated is laid on the support and then covered by the further pin. The support is laid out so that it may change position with the height changes occurring during the pressing and the ratio of the heights of the partial quantities of the powder mixtures above and below the current collector thus remains essentially maintained during the compression procedure.

Further, the device may comprise a two-part filling cavity in the form of two matrices, between which the current collector is positioned. In this embodiment, a symmetrical pressing is performed by two compression means in the form of an upper plunger and a lower plunger. The current collector lying between the two matrices is pressed together from both sides with the powder mixture.

The advantage of the device is that no waste and no scrap are possible. The production allows complex geometries, outstanding shaping, and high mechanical stability of the battery electrodes. Furthermore, high working speeds are possible.

BRIEF DESCRIPTION OF THE DRAWINGS

In the following, one or more embodiments of the invention is explained in greater detail on the basis of exemplary embodiments and the associated drawings:

FIG. 4 shows a further preferred method according to an embodiment of the invention for pressing a battery electrode.

FIG. 7 shows an agglomerate of a cathode material in a side view.

DETAILED DESCRIPTION OF THE INVENTION

The powder mixture comprises—as known from the prior art—the active material of the particular battery electrode, conductivity additives, a polymer binder and/or mixtures of various binders, and possibly additives. The manufacturing of the powder mixture comprising a granulate material is described below.

In principle, all electrode materials which may be produced in the form of a powder are suitable as active materials. Both active materials for producing cathodes and also active materials for producing anodes may be used. The active materials may be suitable both for producing primary batteries (i.e., non-rechargeable batteries) and also for producing secondary batteries (i.e., rechargeable batteries).

Examples of suitable active materials for cathodes are manganese dioxide, doped manganese dioxide, copper oxyphosphate, iron phosphate, lithium-cobalt oxides, lithium-nickel-cobalt oxides, boron-doped or aluminum-doped lithium-cobalt oxides or lithium-nickel-cobalt oxides, silver-vanadium oxide, or fluorinated carbon compounds.

Examples of suitable active materials for anodes are carbon compounds such as graphite, or mesocarbon compounds, and silicon or lithium-titanates.

The use of active materials having particle sizes>10 μm and <70 μm is especially preferred.

For example, spherical, potato-shaped, needle-shaped, or plate-shaped graphites, carbon blacks, expanded graphites, or metal powder are suitable as conductivity additives. Expanded graphites are especially suitable.

The use of conductivity additives having particle sizes>50 nm and <10 μm is especially preferred.

Fluorinated polymers are preferably used as binders of powder-based electrode materials in lithium batteries because of their high thermal and chemical resistance. Typical polymers are, for example, polytetrafluorethylene (PTFE) or polyvinylidene fluoride (PVDF). In order to achieve the highest possible energy density of the battery—i.e., the highest possible concentration of active materials—the binder content is selected as low as possible. The binder concentration is selected in such a way that the required mechanical stability of the electrode and the adhesion of the powder mixture to the current collector are ensured. Perfluorinated polymers such as polytetrafluorethylene (PTFE) or partially-fluorinated polyolefins such as polyvinylidene difluoride (PVDF) are preferably suitable.

The use of binders having particle sizes<10 μm is especially preferred.

Additives are not required for the method described here. However, they may be added to positively influence the properties of the powder mixture, such as the flow behavior, or the properties of the electrodes, such as the porosity. In principle, for example, nanoscale silicon or titanium dioxides are suitable.

Figure 1A:
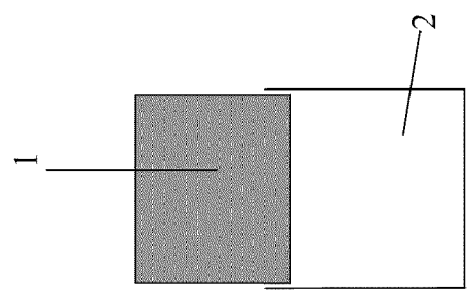
FIG. 1 shows an illustration of a compression press and the methods of asymmetrical and symmetrical pressing from the prior art.
Figure 1B:
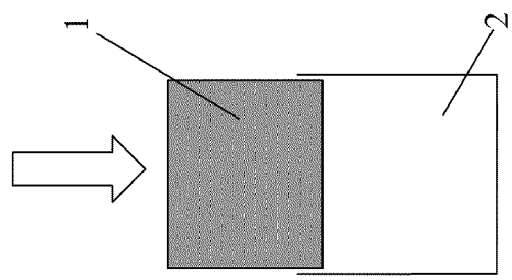
Figure 1C:
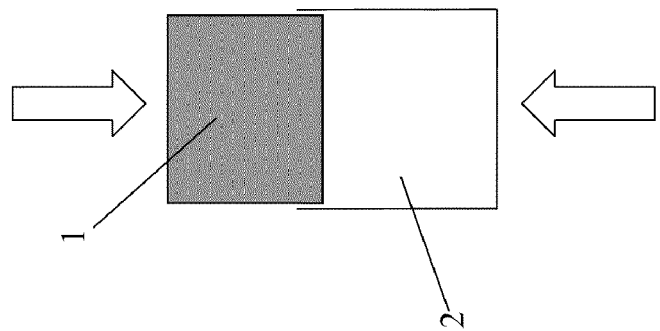

FIGS. 1A through 1C show the compression possibilities of the powder using a plunger-matrix method. The plunger 1 and the matrix 2 are shaped in the desired electrode geometry. Round, rectangular, polygonal, oval, semi-oval, or any other suitable geometries are possible.

The matrix 2 is filled with the powder mixture. The filling is performed either volumetrically or gravimetrically. The powder is compressed either solely by exerting pressure on the plunger 1 (asymmetrical compression)—as shown in FIG. 1B—or by simultaneously pressing together matrix 2 and plunger 1 (symmetrical compression), as shown in FIG. 1C. Symmetrical compression is preferred. Forces between 40 and 200 N/cm$^2$ are used for the compression.

Figures 2A, 2B, 2C:
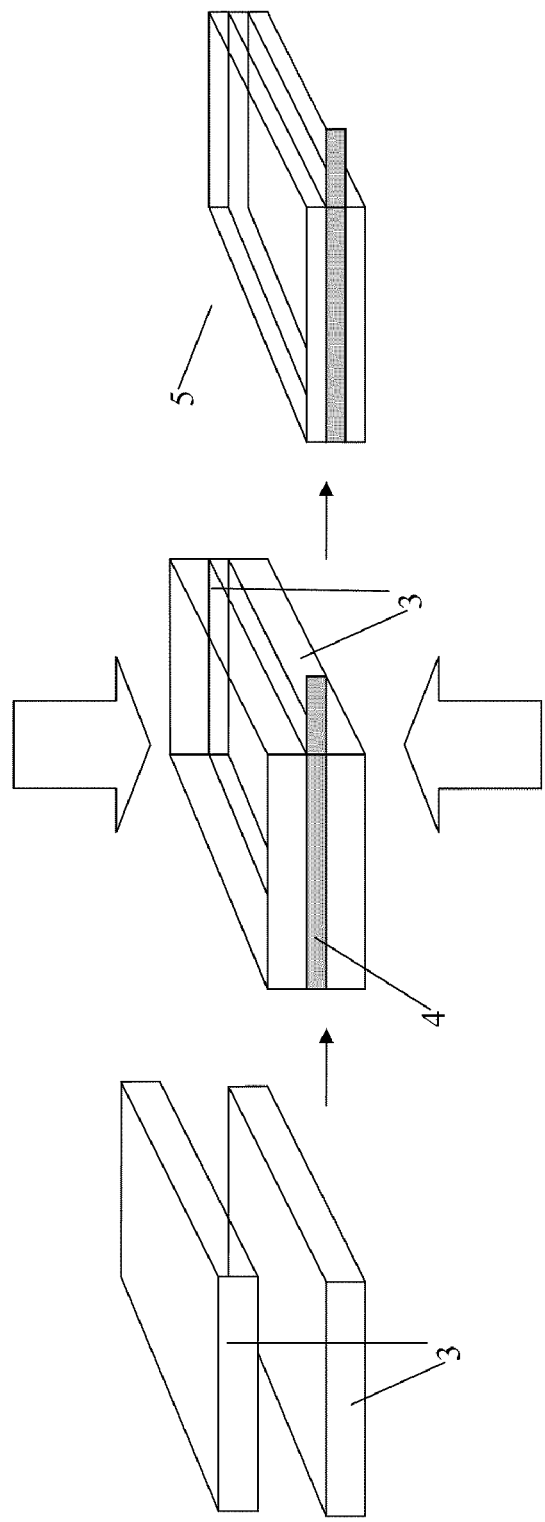
FIG. 2 shows a schematic illustration of the powder pressing method using prepressed pressed parts and subsequent pressing together with a current collector.

FIGS. 2A through 2C show the schematic sequence of the production of a battery electrode according to the method described, by first producing two homogeneous pressed parts 3. A current collector 4, preferably an etched, embossed, or stamped metallic grid or a grid made of stretched metal, is laid between the pressed parts 3. In contrast to the prior art cited, the two pressed parts are not glued to the current collector, but rather the two pressed parts 3 are compressed with the grid to form a unit 5 in a pressing procedure.

Figure 6A:
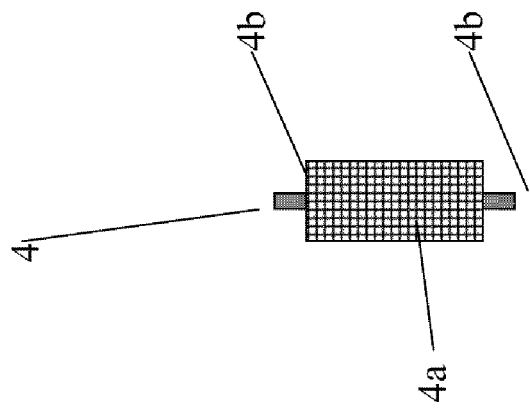
FIG. 6 shows a device for producing battery electrodes comprising a divided filling cavity made of two matrices for performing symmetrical pressing.
Figure 5A:
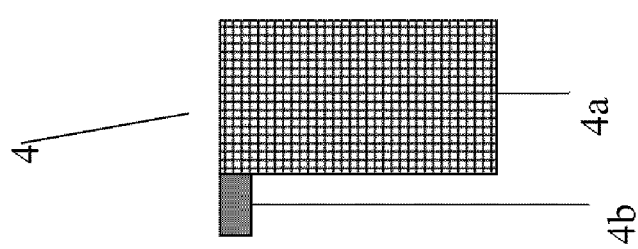
FIG. 5 shows a device for producing battery electrodes comprising a spring-mounted support and a counter support for performing asymmetrical pressing.

The current collector is shown more precisely in FIGS. 5A and 6A. The current collector 4 is formed by a part 4A to be coated, which is covered by pressed powder mixture, and one or more parts 4B not to be coated. The part 4A to be coated is preferably an etched, embossed, or stamped metallic grid or a grid made of stretched metal. The parts 4B not to be coated are implemented as "contact tabs" or any other suitable contact capability. Electrically conductive contacts to the battery housing or to a bushing of the battery may be produced using these parts 4b not to be coated, e.g., by welding.

Figures 3A, 3B, 3C, 3D, 3E, 3F:
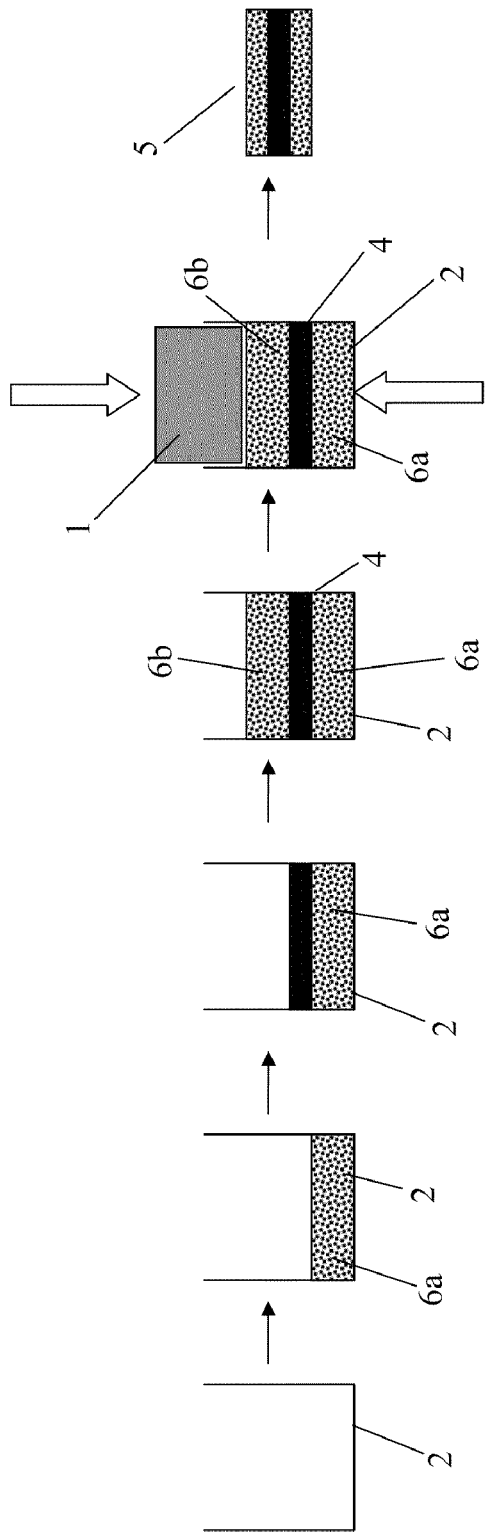
FIG. 3 shows a preferred method according to an embodiment of the invention for pressing a battery electrode.

FIGS. 3A through 3F show a preferred method sequence for producing a battery electrode. Firstly, only half of the powder quantity 6a which is required for the battery electrode 5 is dosed into a filling cavity 2—preferably a matrix (FIG. 3B). The current collector 4, preferably an etched, embossed, or stamped metallic grid or grid made of stretched metal, is laid in the matrix 2 (FIG. 3C) and the other half of the powder quantity 6b which is required for the electrode is then dosed into the matrix 2 (FIG. 3D). Subsequently, the powder quantity is compressed with the current collector 4, which is preferably positioned centrally, with the aid of the compression means 1 FIG. 3E and a battery electrode 5 is thus produced FIG. 3F.

To prevent "sinking" of the current collector 4 into the loose powder mixture 6, the powder mixture 6 may be pre-compressed at low pressure by a pressing procedure after the first dosing procedure.

FIGS. 4A through 4D show a further pressing method according to an embodiment of the invention. The current collector 4, preferably an etched, embossed, or stamped metallic grid or a grid made of stretched metal, is positioned in the matrix 2 (FIG. 4A). The powder quantity 6 that includes powder quantity 6a and 6b required for the electrode is dosed in its entirety into the matrix 2, half of the powder 6b flowing through the current collector 2 (FIG. 4B). The powder quantity 6, i.e., 6a and 6b is then compressed asymmetrically with the aid of compression means 1 (FIG. 4C). After the demolding, the battery electrode 5 is obtained.

Figure 5B:
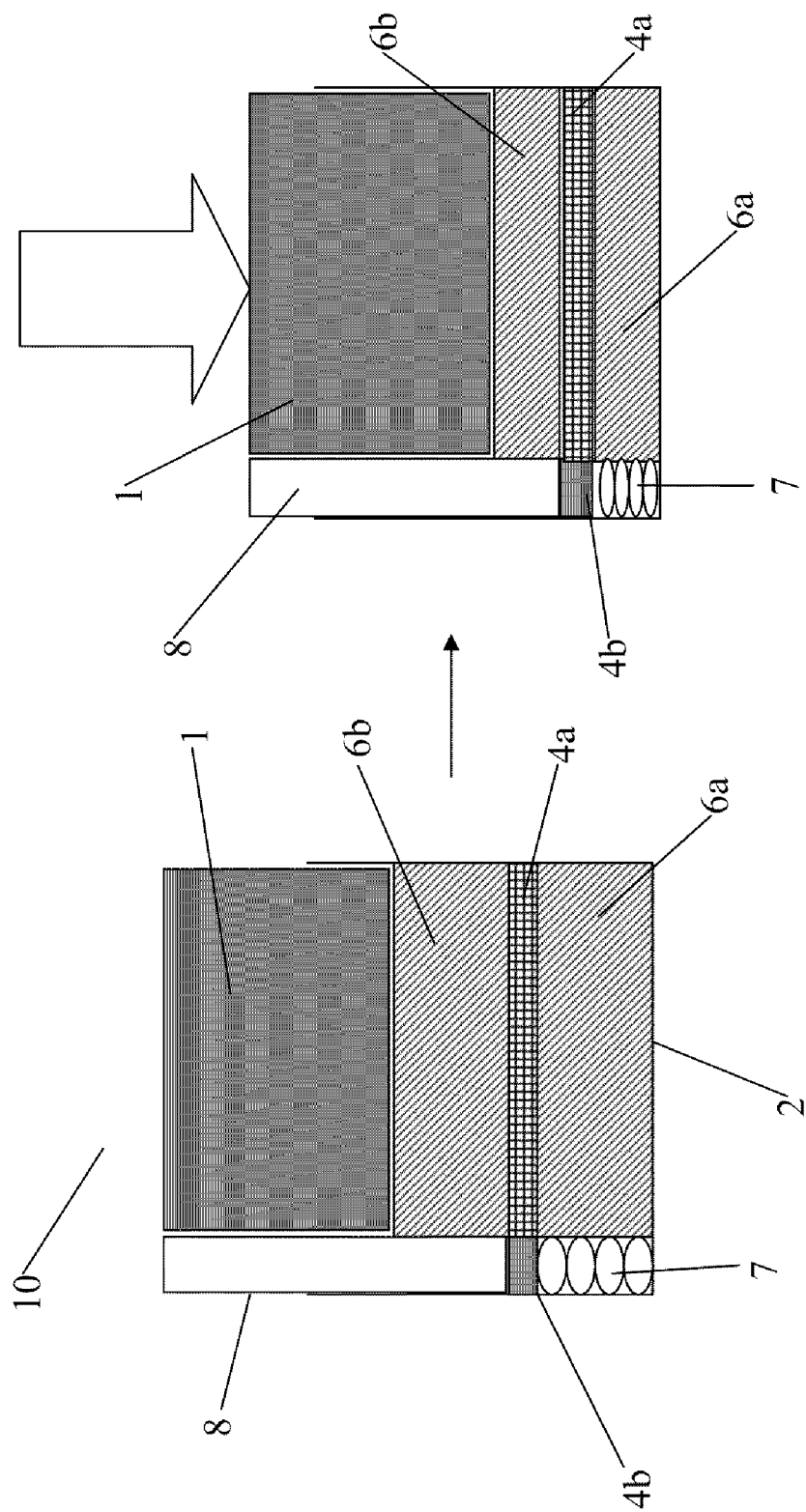

FIG. 5B shows an embodiment of a device 10 for producing a battery electrode, using the asymmetrical pressing method which is described in FIG. 3 or 4 may be performed. The part 4b of the current collector 4 not to be coated is laid on the spring-mounted support means 7. A fixing means 8 is laid on the part 4b of the current collector 4 not to be coated, which lies on the spring-mounted support means 7, so that the area of the part 4b of the current collector 4 not to be coated is covered both from above and also from below. The powder 6 to be compressed may either be poured in halfway before the current collector 4 is inserted or even—if the current collector is a grid—may be poured through the current collector 4.

Both the support means 7 and also the fixing means 8 may comprise a pin, the pin of the support means 7 being spring-mounted and mounted so it is vertically displaceable.

During compression of the powder mixture 6 using a plunger 1, the spring-mounted support 7 is pressed in far enough to correspond to the compression of the powder mixture 6. This ensures that the part 4B of the current collector 4 not to be coated always remains positioned in the plane of the current collector 4 and is not bent during the compression of the powder mixture 6.

Figure 6B:
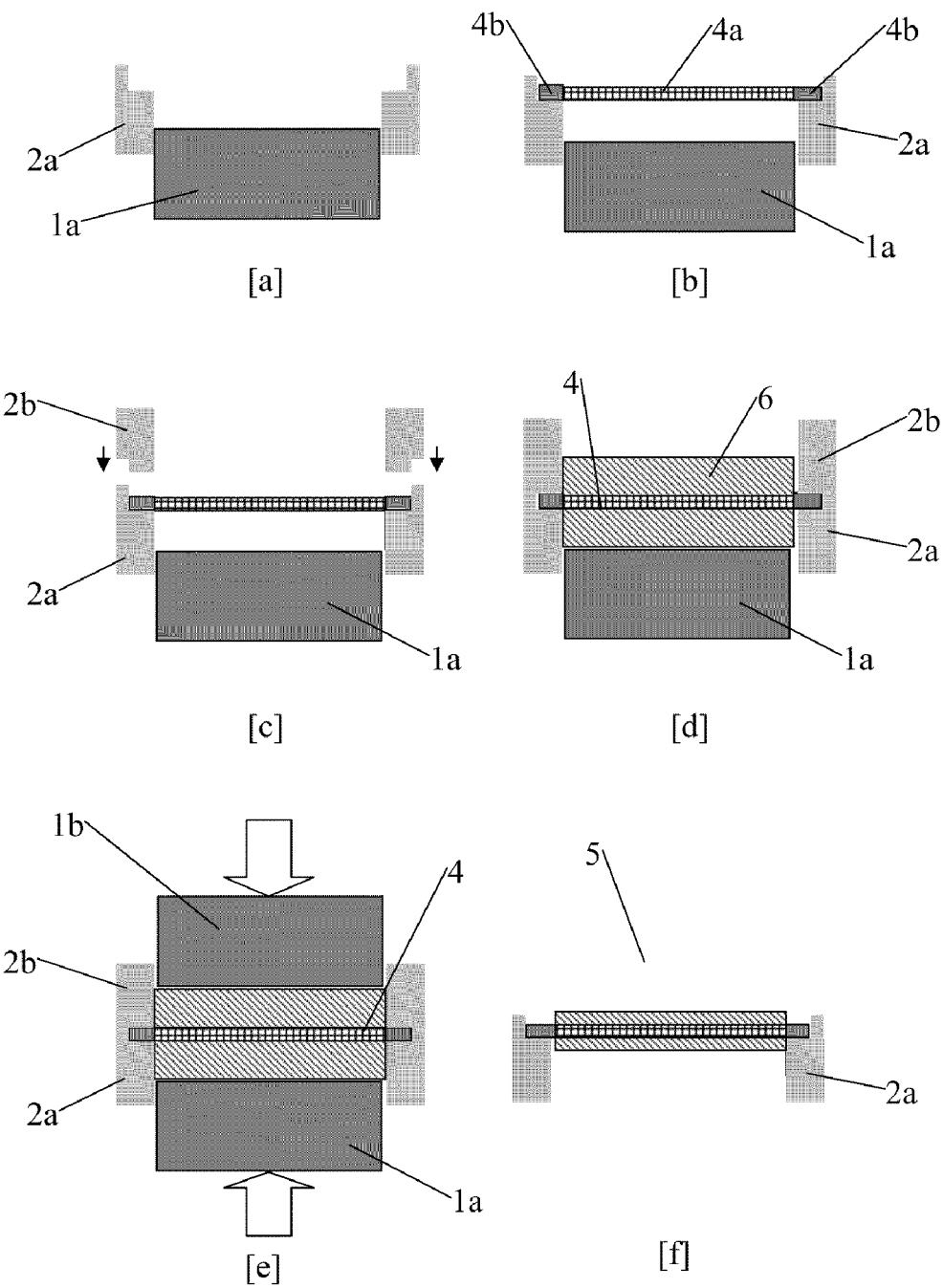

FIG. 6B shows a further embodiment of the device for producing a battery electrode, using which the symmetrical pressing method shown in FIG. 1c may preferably be performed. A multipart matrix 2a and 2b may be used during the pressing procedure. The compression is performed for this purpose using two compression means. The lower plunger 1a is inserted into the lower matrix 2a (a). The current collector 4, preferably an etched, embossed, or stamped metallic grid or grid made of stretched metal, is laid on the lower matrix 2a in such a way that the parts 4b of the current collector 4 not to be coated lie on the upper edge of the lower matrix 2a (b). The upper matrix 2b is placed on the lower matrix 2a. The top of the bottom matrix 2a and the bottom of the top matrix 2 b of the matrices are shaped so that the "tabs" 4b are enclosed in the mold (c). The closed multipart matrix 2 is filled with the powder mixture 6 (d). The upper plunger 1b is subsequently put on and the powder mixture 6 is symmetrically compressed by moving the upper and lower plungers 1a and 1b toward one another under force (e). Finally, the plungers 1a and 1b are drawn back and the upper part of the matrix 2b is removed. The pressed battery electrode 5 may be removed. Picture (f) shows the finished battery electrode lying on the lower matrix 2a of the multipart matrix 2.

The above described procedures make the production of electrodes up to a thickness of 500 μm possible.

The manufacturing of the powder mixture is described below.

Fine disperse graphite (for example GNP 6, RMC Remacon GmbH) and acetylene carbon (for example P50uv, SKW Stickstoffwerke Priesterwitz GmbH) in the relation black carbon 69 weight % and graphite 31 weight % are dry homogenized by an inversion mixture apparatus using mixture additives.

For the manufacturing of the binder suspension (first suspension) the polymer binder (for example PvdF Kynar 741, Atofina Deutschland GmbH) with a relation of 5.5 weight % (this means the fraction of the solid mass of the binder related to the whole electrode mass) is suspended with a high shear gradient (that means high revolution speed) within 400 ml heptan as a inert solvent using a toothed ring disperser.

For the production of a homogeneous mixture of binder and additive the additive mixture is slowly added to the binder suspension in order to produce a homogenous intermediate suspension. At the end the additive mixture is contained by a fraction of 6.5 weight % within the electrode mass. The viscosity should be low. If necessary, up to 100 ml of solvent has to be added as an additional dose.

The intermediate suspension is then used in order to slowly suspend 88 weight % (this means the solid mass fraction of the active material related to the whole electrode mass) of active material (this means the solid mass fraction of the active material related to the whole electrode mass). Preferably Manganese Dioxide as active material is used. After that, the solvent is distilled off during rotating. During distilling a granulation occurs. As a result, a coarse granulate material with spherical granulate particles is formed. The coarse granulate material is then dried in vacuum (pressure below 100 mbar) at a temperature of 100° C. for 8 hours.

The cathode material is then sieved with a sieve having a mesh size of 0.315 mm to a final grain size of about 300 μm maximum. This cathode material may then be further processed by an automatic press.

The adhesion of the binder particles to the active material particles is shown in FIG. 7. Two active material particles 100 agglomerate with two binder particles 200 forming a granulate grain. The binder particles 200 are not diluted within a solvent but just adsorbed at the surface of the active material particles 100.

It will be apparent to those skilled in the art that numerous modifications and variations of the described examples and embodiments are possible in light of the above teaching. The disclosed examples and embodiments are presented for purposes of illustration only. Therefore, it is the intent to cover all such modifications and alternate embodiments as may come within the true scope of this invention.

What is claimed is:

1. A method for manufacturing of a powder mixture for a battery electrode comprising the following steps:
    suspending of particles of at least one binder within an inert solvent in producing a first suspension wherein the at least one binder is not soluble or is very weakly soluble within the inert solvent;
    slowly suspending of particles of an active material within said first suspension in producing a second suspension wherein the inert solvent is chemically inert with respect to the active material;
    drying of said second suspension in producing a dry granulate material that is dry, free flowing and comprises a weak affinity to agglomeration wherein said at least one binder and said active material are configured to adhere during application of pressure when forming a battery electrode and wherein said inert solvent is not present during said application of pressure when forming said battery electrode.

2. The method according to claim 1, further comprising sieving said granulate material with a sieve with a predefined mesh width after said drying of said second suspension.

3. The method according to claim 1, further comprising suspending particles of at least one additive within the first suspension, between said producing said first suspension and said producing said second suspension.

4. The method according to claim 1, wherein said active material comprises a material for a cathode comprising a metal oxide or manganese dioxide or lithium cobalt oxide or lithium manganese spinel or lithium nickel cobalt oxide or silver vanadium oxide or a metal phosphate or copper oxyphosphate or iron phosphate or vanadium oxyphosphate or metal vanadate or copper vanadate or metal chromate or lead chromate.

5. The method according to claim 1, wherein said active material comprises a material for an anode comprising carbon or graphite or a meso-carbon composition or metal-oxide or lithium-titanium-oxide.

6. The method according to claim 1, wherein said at least one binder comprises polyvinylidendifluorid, polyethylene or polypropylene.

7. The method according to claim 1, further comprising an additive wherein said additive comprises carbon black, graphite, expanded graphite, carbon fibers, metals and porosity promoters, or ammonium-carbonate.

8. The method according to claim 1, wherein said solvent comprises alkanes, cycloalkanes, olefines, cyclic olefines, hexane, cyclohexane, heptane, octane, ethers or alcohols.

* * * * *